(12) United States Patent
Masuda et al.

(10) Patent No.: US 6,181,512 B1
(45) Date of Patent: *Jan. 30, 2001

(54) DISK DRIVE

(75) Inventors: Atsushi Masuda; Shigeru Furuki, both of Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/168,975

(22) Filed: Sep. 24, 1998

(30) Foreign Application Priority Data

Oct. 2, 1997 (JP) .................................................. 9-269743

(51) Int. Cl.[7] .......................... G11B 17/028; G11B 19/20
(52) U.S. Cl. ........................................................ 360/99.08
(58) Field of Search ............................ 360/99.08, 97.01, 360/88, 99.04

(56) References Cited

U.S. PATENT DOCUMENTS

| | | | | |
|---|---|---|---|---|
| 4,825,314 | * | 4/1989 | Maekawa et al. | 360/99.08 |
| 5,010,427 | * | 4/1991 | Taguchi et al. | 360/99.05 |
| 5,072,321 | * | 12/1991 | Kanai et al. | 360/99.04 |
| 5,183,350 | * | 2/1993 | Kramer | 403/4 |
| 5,274,519 | * | 12/1993 | Saito et al. | 360/105 |
| 5,432,352 | * | 7/1995 | van Bavel | 250/492.21 |
| 5,533,000 | * | 7/1996 | Koizumi | 369/270 |
| 5,608,640 | * | 3/1997 | Itoh | 700/188 |
| 5,669,652 | * | 9/1997 | Reising et al. | 294/88 |
| 5,793,567 | * | 8/1998 | Hong | 360/99.08 |
| 5,825,586 | * | 10/1998 | Teshima | 360/99.04 |
| 5,908,122 | * | 6/1999 | Robinett et al. | 212/275 |
| 6,031,685 | * | 2/2000 | French et al. | 360/97.01 |
| 6,031,687 | * | 2/2000 | Konno et al. | 360/99.12 |
| 6,038,206 | * | 3/2000 | Mukawa | 369/271 |

FOREIGN PATENT DOCUMENTS

409044954A * 2/1997 (JP) .

* cited by examiner

Primary Examiner—David L. Ometz
Assistant Examiner—Franklin D. Altman
(74) Attorney, Agent, or Firm—Brinks Hofer Gilson & Lione

(57) ABSTRACT

Inertia couple (F1) generated by the agency of an angular acceleration at which a turntable (2) is accelerated after the same has started rotation and the inertial moment of a rotating body including a hub (11) provided with a center hole (12) and a drive hole (13) are exerted on a hub supported on the turntable (2) by the tip (3a) of a center shaft (3) attached to the turntable (2) and a drive pin (5) supported on the turntable (2). The hub (11) is moved for centering by the inertia couple (F1) so that the respective edges (12a, 13a) of the center hole (12) and the drive hole (13) are brought into contact with the tip (3a) of the center shaft (3) and the drive pin (5), respectively. Any force need not be applied by magnetic heads on the rotating body for centering.

2 Claims, 3 Drawing Sheets

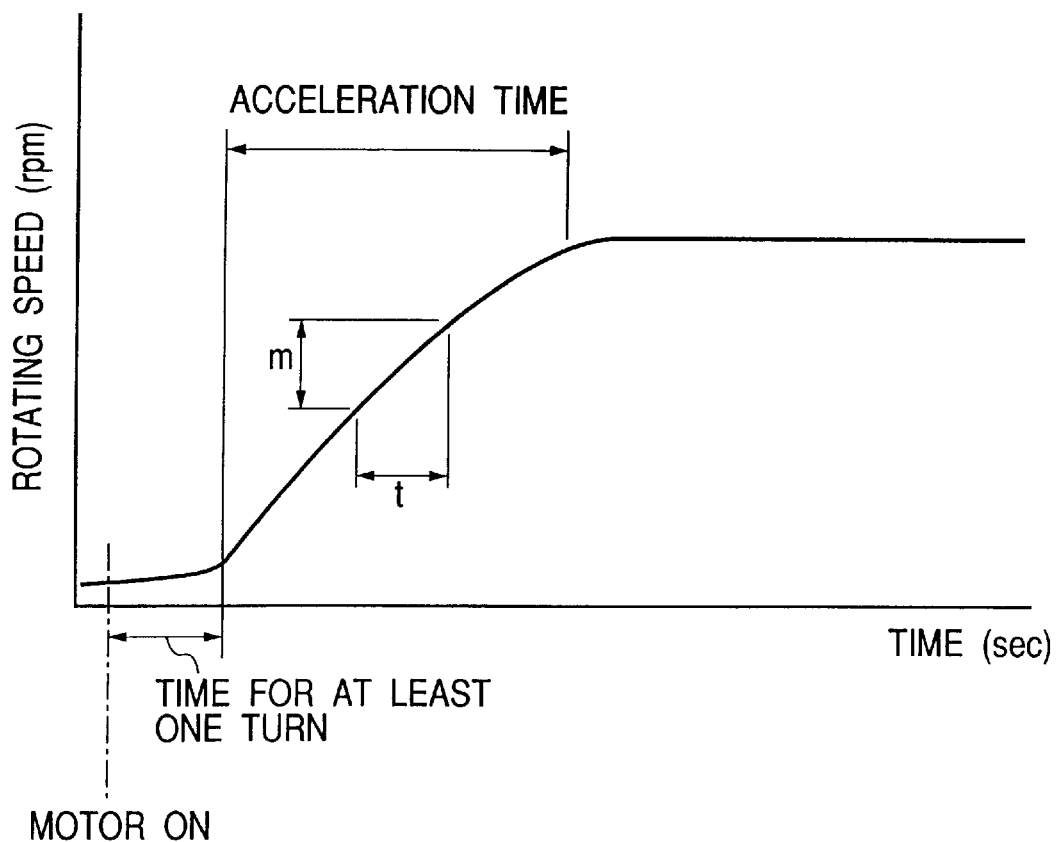

DISK DRIVE

BACKGROUND OF THE INVENTION

1. Field of the Invention

The present invention relates to a disk drive for driving a disk-shaped recording medium, such as a floppy disk, and, more specifically, to a disk drive provided with a turntable capable of centering the central hub of a disk mounted thereon.

2. Description of the Related Art

A floppy disk has a flexible disk, i.e., a flexible magnetic recording medium, provided with a central metal hub. The metal hub is provided with a center hole and a drive hole. A disk drive for driving the disk for rotation is provided with a turntable provided with a magnet for attracting the metal hub of the disk, a center shaft projecting from the support surface of the turntable, and a drive pin supported on a plate spring or a swing arm so as to be able to project from the support surface of the turntable.

When a floppy disk is loaded into the disk drive, the center hole of the hub receives the center shaft of the disk drive, and the drive pin plunges into the drive hole immediately after the turntable has started rotation. Subsequently, a centering operation is executed to position the hub correctly on the turntable. During the centering operation, the center shaft comes into contact with the edge of the center hole from one direction and the drive pin comes into contact with the edge of the drive hole from the opposite direction as the turntable rotates, and the hub slides slightly on the support surface of the turntable.

In this centering operation, the hub comes into close contact with the support surface of the turntable upon the entrance of the drive pin into the drive hole of the hub, and is attracted by a large force by magnetic attraction. The hub must be caused to slide on the turntable against the magnetic attraction to bring the center shaft and the drive pin into contact with the edges of the center hole and the drive hole, respectively. This centering operation nips the flexible disk between magnetic heads to move the hub relative to the turntable.

If the magnetic heads are unable to exert sufficient pressure to the disk, the hub cannot be moved on the turntable and the centering operation cannot successfully be achieved. In a disk drive for driving the disk of a high-capacity floppy disk for rotation at several thousands revolutions per minutes, the moving speed of the magnetic heads relative to the disk is very high. Therefore, the magnetic heads cannot be pressed by a high pressure to the disk in view of suppressing the abrasion of the magnetic heads. In a disk drive which drives a disk for rotation at 2400 rpm, pressure exerted by the magnetic head on the disk is on the order of ten and some gram force or several gram force so that the magnetic heads will exert a very low resistance, i.e., torque, on the disk. Accordingly, this disk drive is unable to achieve a reliable centering operation for centering the hub on the turntable.

SUMMARY OF THE INVENTION

Accordingly, it is an object of the present invention to provide a disk drive capable of positioning the hub of a disk in a high accuracy on a turntable without increasing torque that may be exerted on the disk by magnetic heads.

According to one aspect of the present invention, a disk drive for driving a floppy disk having a disk provided with a center hub provided with a center hole and a drive hole comprises: a turntable capable of exerting magnetic attraction on the hub of the disk to attract the hub to a support surface thereof and having a center shaft projecting from the support surface thereof so as to be inserted in the center hole of the hub when the disk is placed on the support surface; and a drive pin supported so as to be projected from the support surface of the turntable and inserted in the drive hole of the hub when the disk is placed on the support surface. In this disk drive, an angular acceleration at which the hub is accelerated by the rotating turntable and the magnetic attraction are determined so that inertia couple generated by the agency of the angular acceleration of the hub rotated by the turntable and the inertial moment of a rotating body including the hub or their components exerted on the hub supported on the turntable by the center shaft and the drive pin at points of contact of the center shaft and the drive pin with the hub are greater than a frictional force acting between the support surface of the turntable and the hub magnetically attracted to the support surface, and the edge of the center hole of the hub is brought into contact with the center shaft from one direction and the edge of the drive hole of the hub is brought into contact with the drive pin from the other direction by the inertia couple or their components.

The inertia couple are exerted on the hub fitted on the center shaft and the drive pin at the points of contact between the edges of the center hole and the drive hole of the hub, and the center shaft and the drive pin by the agency of the angular acceleration of the hub immediately after the turntable has started rotating and the inertial moment of the rotating body, and the inertia couple are used for moving the hub on the turntable for centering. Since the torque need not be exerted on the disk by magnetic heads for centering, the hub can be positioned in a high accuracy on the turntable immediately after the start of rotation of the turntable even if the magnetic heads are pressed by a low pressure against the disk of a high-capacity floppy disk or even at a stage before the magnetic heads are brought into contact with the disk. For example, the following expression is satisfied.

$$Fg \cdot \mu < \frac{I \cdot 2\pi \cdot m}{L \cdot t} \qquad (1)$$

where the left side ($Fg \cdot \mu$) expresses frictional force and the right side expresses inertia couple, Fg is attraction acting on the hub, $\mu$ is the coefficient of static friction between the hub and the support surface, the right side expresses inertia couple, I is the moment of inertia of the rotating body including the hub, m is an increment of rotating speed in time t, and L is the center distance between the center shaft and the drive pin.

If the inertia couple acting on the hub exceed the frictional force, the hub can be slid for centering on the turntable without using torque which can be applied to the disk by the magnetic heads. Conditions meeting Expression (1) are effective in centering a hub as shown in FIG. 2. In FIG. 2, centering forces for bringing the edges of a center hole and a drive hole formed in the hub into contact with the center shaft and the drive pin are substantially equal to inertia couple F1. When the inertia couple F1 are greater than the frictional force, the hub can be slid for centering relative to the support surface of the turntable by the centering forces F1.

If a centering force Fc is a components of the inertia couple F1 and is smaller than F1 as shown in FIG. 4A, a reduction of the centering force by the component of the inertia couple F may be taken into consideration when determining the inertia couple F1 and the frictional force.

Time for which the angular velocity of the hub is changed at the angular acceleration is longer than a time interval between a moment when the drive pin comes into contact with a forward part of the edge of the drive hole and a moment hen the edge of the center hole is brought into contact with the center shaft by the inertia couple.

If the drive hole has the shape of a slot extending in the direction of rotation of the hub as shown in FIG. 3, the start of acceleration of the hub and duration of acceleration of the hub may be determined so that the drive pin moves in the drive hole, and the centering operation is carried out after the drive pin has come into contact with the edge of the drive hole.

BRIEF DESCRIPTION OF THE DRAWINGS

The above and other objects, features and advantages of the present invention will become more apparent: from the following description taken in connection with the accompanying drawings, in which:

FIG. 5 is a graph showing the variation of the rotating speed of a turntable.

DESCRIPTION OF THE PREFERRED EMBODIMENTS

Figure 1:
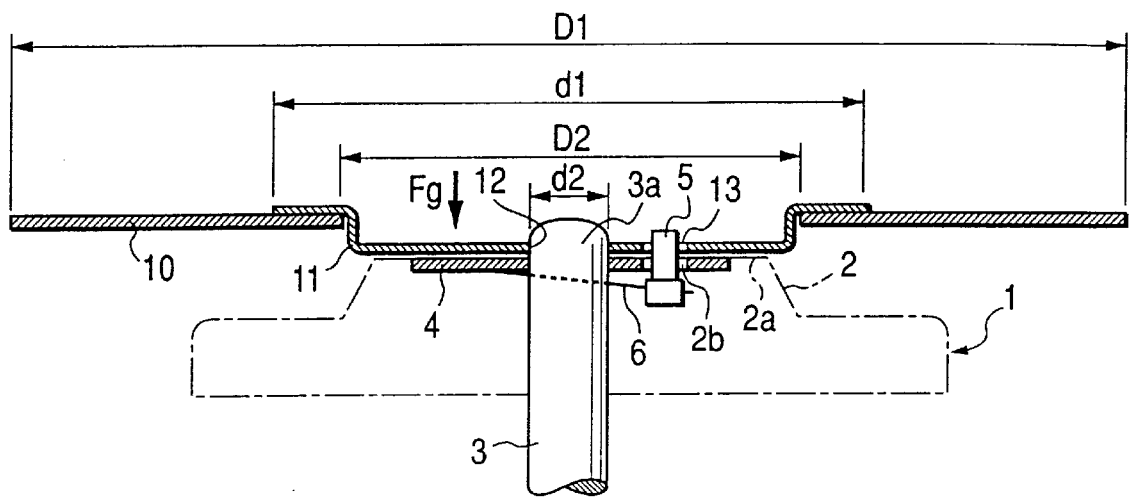
FIG. 1 is a longitudinal sectional view of a disk drive in a preferred embodiment according to the present invention.

Referring to FIG. 1, a rotative drive unit 1 has a turntable 2 having an upper surface serving as a support surface 2a. The turntable 2 is fixed to a center shaft 3, i.e., a spindle, supported in bearings. The turntable 2 rotates about the axis of the center shaft 3. The turntable 2 is the rotor of a brushless motor. By a driving force of the brushless motor, the center shaft 3 and the turntable 2 are rotated.

A magnet 4, i.e., a magnetic attracting member, is placed on the support surface 2a to hold a hub 11 of a disk 10 by a magnetic attraction. A drive pin 5 is supported on an extremity of a plate spring 6 held inside the turntable 2. The drive pin 5 can be projected upward from a hole 2b formed in the turntable 2 by the resilience of the plate spring 6. The drive pin 5 may fixedly be held on a swing arm supported on the turntable 2.

A rotating body is a flexible magnetic disk 10, i.e., a floppy disk, provided with a metal hub 11 fixed to the central part thereof. The magnetic disk 10 provided with the hub 11 is contained in a protective envelope, not shown.

Figure 2:
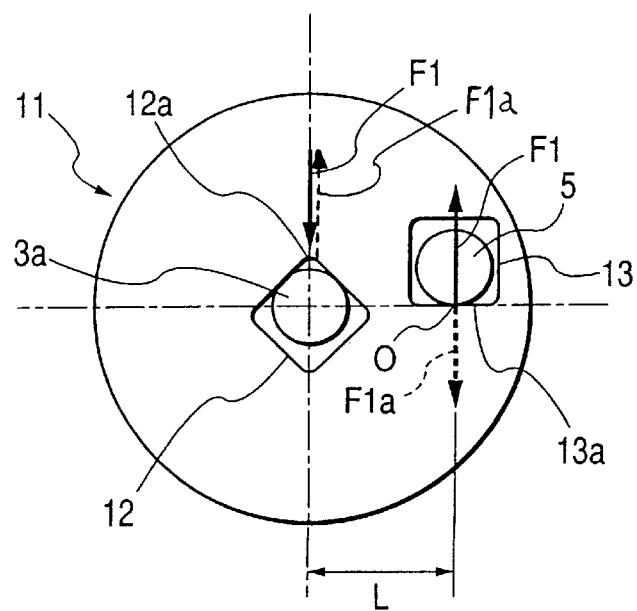
FIG. 2 is a plan view of a hub.

As shown in FIG. 2, the hub 11 is provided with a center hole 12 and a drive hole 13. When the rotating body is loaded into the disk drive, the tip 3a of the center shaft 3 is inserted in the center hole 12, and the drive pin 5 is inserted in the drive hole 13. When the turntable 2 is rotated in a clockwise direction as viewed in FIG. 2 after loading the rotating body into the disk drive, the drive pin 5 comes into contact with the edge 13a of the drive hole 13, and the tip 3a of the center shaft 3 comes into contact with edge 12a defining a corner of the center hole 12a.

The tip 3a of the center shaft 3 comes into contact with the edge 12a of the center hole 12 and the drive pin 5 comes into the edge 13a of the drive hole 13 from the opposite directions, respectively. Consequently, the center of the hub 11 coincides with the center axis of the center shaft 3. Thus, a centering operation is achieved to center the hub 11 on the turntable 2.

FIG. 5 is a graph showing the variation of the rotating speed of the turntable with time after the disk 10 provided with the hub 11 has been loaded into the disk drive and a motor for driving the turntable 2 has been started.

When the disk 10 provided with the hub 11 is loaded into the disk drive, the hub 11 is seated on the support surface 2a of the turntable 2 and the tip 3a of the center shaft 3 is inserted in the center hole 12. Referring to FIG. 5, in an initial period in which the turntable 2 is rotated at least one turn after the motor has been started, the turntable 2 is accelerated at a low acceleration. In this initial period, the drive pin 5 plunges into the drive hole 13 and then comes into contact with the edge 13a of the drive hole 13. Since the turntable 2 is accelerated at a low acceleration, the impact of the drive pin 5 on the edge 13a of the drive hole 13 can be prevented.

After the end of the initial period for rotating the turntable 2 at least one turn at a low acceleration, the turn table 2 is accelerated at a high angular acceleration for a predetermined acceleration time, and then the turntable 2 is rotated at a fixed rotating speed after the acceleration time has elapsed. A moment is applied to the disk 10 provided with the hub 11 in the acceleration time by the agency of the angular acceleration and the inertial moment of the disk 10 provided with the hub 11.

Consequently, couple F1a are exerted on the edge 13a of the drive hole 13 between the center shaft 3 and the drive pin 5, and the reaction of the edge 13a of the drive hole 13 produces a counterclockwise moment about the point 0 of contact between the drive pin 5 and the edge 13a of the drive hole 13 is applied to the hub 11. The edge 12a of the center hole 12 of the hub 11 is pressed against the tip 3a of the center shaft 3 by the resultant couple F1, so that the hub 11 is centered on the turntable 2.

If the disk drive in a standby state or a sleep state in which the disk 10 provided with the hub 11 has previously been mounted on the turntable 2, the drive pin 5 is in contact or almost in contact with the edge 13a of the drive hole 13. Therefore, the acceleration time is started to accelerate the turntable 2 at a high angular acceleration for centering immediately after the motor has been actuated.

A frictional force resulting from a force Fg, i.e., the sum of the weight of the disk 10 provided with the hub 11 and the magnetic attraction of the magnet 4 attracting the hub 11 to the support surface 2a, must be smaller than the inertia couple F1, i.e., Expression (1) must be satisfied. When the inertia couple F1 are greater than the frictional force, the hub 11 is caused to slide slightly on the support surface 2a of the turntable 2 by the inertia couple F1, so that the edge 12a of the center hole 12 comes into contact with the center shaft 3 for centering.

Expression (1) will be explained below. The sum of moment which acts on the rotating body consisting of the disk 10 and the hub 11 during the acceleration time (FIG. 5) is expressed by:

$$M = I \cdot \frac{d\omega}{dt} \quad (2)$$

where I is the moment of inertia of the rotating body, and dω/dt is angular acceleration.

$$I = \frac{W1}{8g}(D1^2 + D2^2) + \frac{W2}{8g}(d1^2 + d2^2) \quad (3)$$

where W1 is the weight of the disk 10, D1 is the outside diameter of the disk 10, D2 is the inside diameter of the disk 10, W2 is the weight of the hub 11, d1 is the outside diameter of the hub 11, d2 is the inside diameter of the hub 11 and g is the gravitational acceleration.

The angular acceleration dω/dt (rad/sec²) is expressed by:

$$\frac{d\omega}{dt} = \frac{2\pi \cdot m}{t} \quad (4)$$

where t is measuring time and m is increment in rotating speed in the measuring time t.

The couple F1a and inertia couple F1 (FIG. 2) are expressed by:

$$F1 = F1a = \frac{M}{L} = \frac{I}{L} \cdot \frac{d\omega}{dt} = \frac{I \cdot 2\pi \cdot m}{L \cdot t} \quad (5)$$

where L is the distance between the axis of the center shaft 3 and the point 0 of contact of the drive pin 5 and the edge 13a of the drive hole 13.

Frictional force acting between the hub 11 and the support surface 2a is Fg·μ, where μ is the coefficient of static friction between the hub 11 and the support surface 2a. Therefore, the following expression must be met to make the inertia couple F1 exceeds the frictional force.

$$Fg < \frac{I \cdot 2\pi \cdot m}{L \cdot t \cdot \mu} \quad (6)$$

Figure 3:
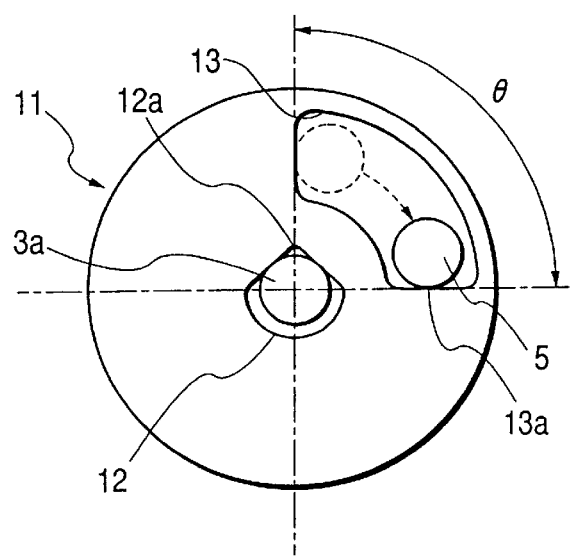
FIG. 3 is a plan view of a hub provided with an elongate drive hole.

The acceleration time shown in FIG. 5 will be explained below. Suppose that the drive hole 13 of the hub 11 is a circular slot extending through an angle θ as shown in FIG. 3. The drive pin 5 plunges into the drive hole 13, moves in the drive hole 13 and comes into contact with the edge 13a of the drive hole 13, and the edge 12a of the center hole 12 comes into contact with the tip 3a of the center shaft 3 as the turntable 2 rotates. The acceleration time shown in FIG. 5 must be longer than the time in which the drive pin 5 comes into contact with the edge 13a of the drive hole 13 and the edge 12a of the center hole 12 comes into contact with the tip 3a of the center shaft 3.

In the hub 11 shown in FIG. 2, the couple F1 acting on the hub 11 at the opposite ends of an arm of a length L is substantially equal to a centering force which moves the hub 11 relative to the turntable 2.

Figure 4A:
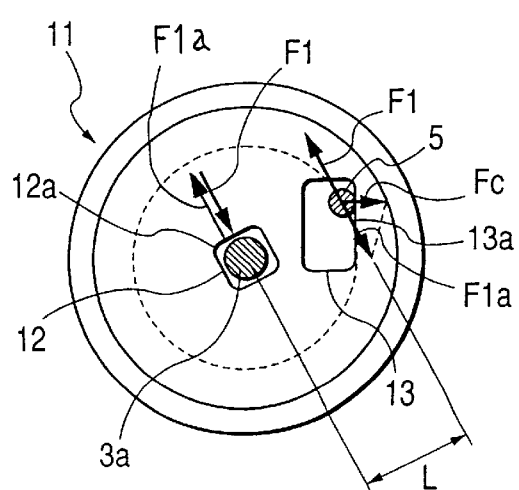
FIGS. 4A and 4B are plan views of assistance in explaining actions of a hub.
Figure 4B:
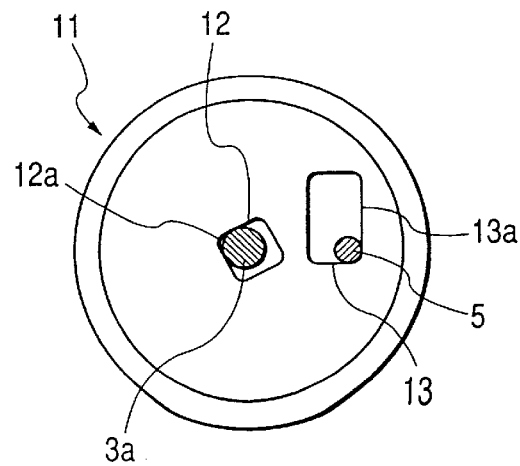

If the drive pin 5 exerts a centering force Fc on the edge 13a of the drive hole 13 after the same has plunged into the drive hole 13 as shown in FIGS. 4A and 4B to shift the hub 11 on the turntable 2 in the sense of the force Fc so that the edge 12a of the center hole 12 is brought into contact with the tip 3a of the center shaft 3 for centering, the inertia couple F1 are not equal to the centering force Fc. In this case, components of the couple F1a and the inertia couple F1 acting on the hub 11 at the opposite ends of an arm of a length equal to the distance L (FIG. 4A) between the respective axes of the center shaft 3 and the drive pin 5 act as the centering force Fc. The centering force Fc, i.e., a component of the inertial couple F1a must be greater than the frictional force acting between the hub 11 and the turntable 2.

Forces that may act on the disk 10 provided with the hub 11 shown in FIG. 2 will be calculated.

Measurements of the Disk 10
W1=0.63 gf, D1=9.5 cm, D2=2.35 cm
Measurements of the Hub 11
W2=2.46 gf, d1=2.7 cm, d2=0.4 cm
Gravitational Acceleration
g=980 cm/sec²
Calculated moment of inertia (I)=0.0100 gf·cm·sec²
Angular Acceleration
m/t=240 rps/sec (Measured)
dω/dt=2π·m=480·π rad/sec²
Inertia Couple F1
Inertia couple F1 is calculated by using a measured value 0.6 cm of L and Expression (5).
F1=25.1 gf Thus the inertia couple F1 (FIG. 2), i.e., centering forces, are 25.2 gf when the disk 10 is accelerated at an angular acceleration of 240 rps/sec.

Frictional Force

A measured force necessary for shifting the hub 11 on the turntable 2 against a frictional force was 25 gf when the attraction Fg attracting the hub 11 to the turntable 2 was 27 gf and the coefficient μ of static friction between the hub 11 and the support surface 2a was 0.926. The frictional force 25 gf is smaller than the centering force F1=25.2 gf. Therefore, the hub 11 can be centered on the turntable 2 without applying any external force to the hub 11 if the attraction Fg is 27 gf or below.

As is apparent from the foregoing description, according to the present invention, the hub can be centered on the turntable by accelerating the disk provided with the hub at an appropriate angular acceleration in an acceleration time subsequent to the start of rotation of the turntable without applying any external force by, for example, magnetic heads. Therefore, even a disk to be rotated at a high rotating speed with magnetic heads kept in light contact with the disk by a low contact force can surely be centered, and the hub can be centered even before magnetic heads are brought into contact with the disk.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A disk drive for driving a floppy disk having a center hub, the center hub having a center point, a center hole and a drive hole, said disk drive comprising:

a rotating turntable including a support surface, a magnet for exerting magnetic attraction on the hub of the disk to said support surface, a center shaft that rotates about a central axis and projecting from the support surface so as to be inserted in the center hole of the hub when the disk is placed on the support surface; and a drive pin spring mounted on the rotating turntable that is urged upwardly to project from the support surface of the turntable and is inserted in the drive hole of the hub when the disk is placed on the support surface;

wherein a high angular acceleration of the turntable is set for a predetermined acceleration time during which the hub is accelerated by the rotating turntable such that an inertia couple is generated by the angular acceleration of the hub and the inertial moment of a rotating body including the hubs inertia couple being exerted on the hub by the center shaft and the drive pin at points of contact of the center shaft and the drive pin with the hub, said inertia couple being greater than the frictional force acting between the support surface of the turntable and the hub which is magnetically attracted to the support surface, such that an edge of the center hole of the hub is brought into contact with the center shaft from one direction and an edge of the drive hole of the hub is brought into contact with the drive pin from an opposing direction by the inertia couple such that the center point of the hub coincides with the central axis of the center shaft;

said disc drive satisfying the following statement:

$$Fg \cdot \mu \left( \frac{I \cdot 2\pi \cdot m}{L \cdot t} \right.$$

where the left side expresses frictional force and the right side expresses inertia couple, Fg is attraction acting on the hub, $\mu$ is the coefficient of static friction between the hub and the support surface of the turntable, the right side expresses inertia couple, I is the moment of inertia of the rotating body including the hub, m is an increment of rotating speed intime t, and L is the center distance between the center shaft and the drive pin.

2. The disk drive according to claim 1, wherein a first time interval of the angular acceleration is longer than a second time interval between the drive pin contacts a forward part of the edge of the drive hole and the edge of the center hole contacts the center shaft resulting from the inertia couple.

* * * * *

UNITED STATES PATENT AND TRADEMARK OFFICE
CERTIFICATE OF CORRECTION

PATENT NO. : 6,181,512 B1  
DATED : January 30, 2001  
INVENTOR(S) : Atsushi Masuda et al.

It is certified that error appears in the above-identified patent and that said Letters Patent is hereby corrected as shown below:

Claims,
Line 19, delete "hubs" and substitute -- hub, said -- in its place.
Line 40, delete "intime" and substitute -- in time -- in its place.

Signed and Sealed this

Second Day of April, 2002

Attest:

JAMES E. ROGAN  
Attesting Officer     Director of the United States Patent and Trademark Office